Dec. 20, 1932. M. G. HARNDEN 1,891,230
PROCESS OF STAMPING ICE CREAM SHAPES
Filed May 6, 1930
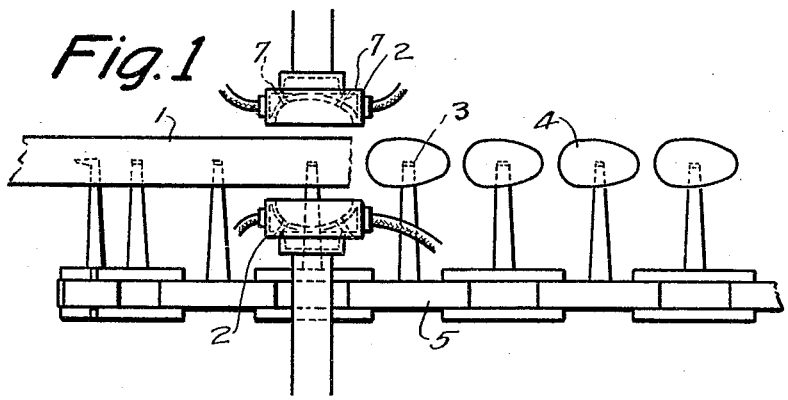
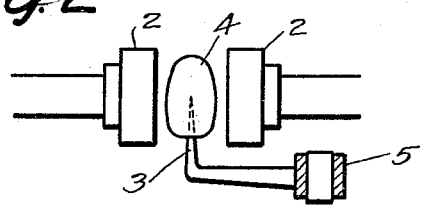
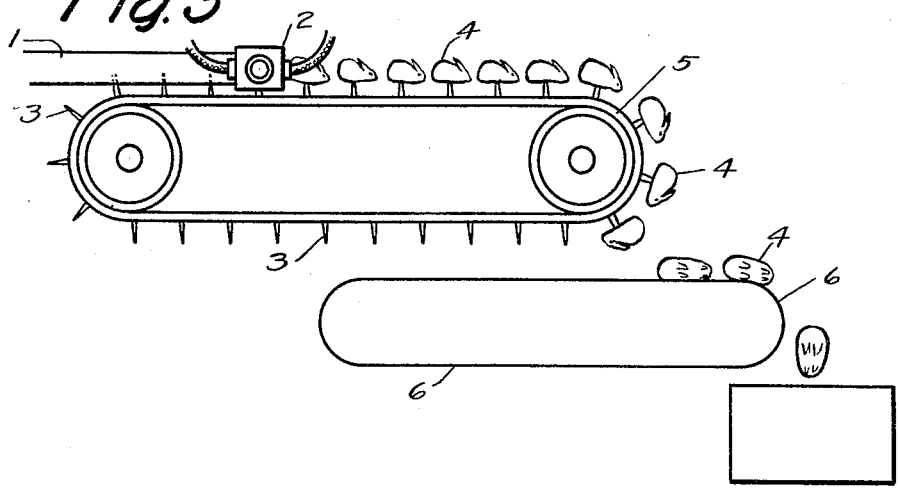
INVENTOR.
Millard G. Harnden
BY
ATTORNEY.

Patented Dec. 20, 1932

1,891,230

UNITED STATES PATENT OFFICE

MILLARD G. HARNDEN, OF SEATTLE, WASHINGTON

PROCESS OF STAMPING ICE CREAM SHAPES

Application filed May 6, 1930. Serial No. 450,321.

This invention relates to the process of forming, shaping, embossing or stamping shapes or characters from ice cream, sherbets, ices, frozen puddings, frozen confections, salads or any similar product, in the same manner as objects are stamped from metals or other materials.

The object of the invention is, therefore, to provide a process of stamping ice cream into shapes automatically.

Another object of the invention is to provide means for stamping frozen confections in certain designs, or with embossing, figures, characters or objects of any description.

Another object of the invention is to provide a method of producing shapes from frozen confections so economically that they may be sold at a small price in order to stimulate consumption and use.

Another object of the invention is to provide means for forming ice cream shapes by stamping, which eliminates the contact of the product with the human body, thereby increasing the sanitation thereof.

A further object of the invention is to provide means for stamping objects from ice cream which may be used repeatedly and by which the objects may be stamped and instantly removed from the dies automatically.

With these ends in view the invention embodies the process of preparing ice cream of a certain consistency and at a certain temperature, feeding it between dies, stamping it with the dies into shapes or by stamping designs, emblems, or characters on the shapes with means for supporting and removing the shapes.

Other features and advantages of the invention will appear from the following description taken in connection with the drawing, wherein:—

Figure 1 is a plan view showing the general arrangement.

Figure 2 is a sectional view through the machine showing the arrangement of the prongs for holding the objects.

Figure 3 is a side view showing the operation.

Practically any ordinary commercial ice cream having eleven to fourteen percent fat and thirty-two to thirty-six percent total solids is satisfactory. However, it will be understood that ice cream of a slightly different composition will be satisfactory or may even be better.

The ice cream is taken from a sharp or hardening room where it is maintained at a temperature of from twelve to twenty degrees below zero and permitted to warm until it softens to a plastic state where a strip of ice cream will bend but not break and at the same time be cold enough to prevent the outside melting rapidly. If desired, the ice cream may be permitted to mellow considerably and then be placed back into the sharp room, or any other desired device to chill the outer surface. This will provide a strip of ice cream with a slightly hardened outer surface and the interior slightly plastic, as with the outside slightly frozen it will not adhere to the dies.

A strip of ice cream 1 in this condition is fed between horizontally moving dies 2 so that as the dies come together they stamp the ice cream around pins 3 and then as they recede the shapes 4 will remain standing in vertical positions with the pins extending up into them. The pins 3 may be located upon endless chains 5 or any other suitable mechanism, and will operate intermittently so that there will be one pin between the dies every time they come together. The pins 3 may then be permitted to turn upside down so that the shapes may move off of them and thereby be fed to a conveyor 6 or other suitable device.

The dies 2 may be made of aluminum, or any other suitable material which is a rapid conductor of heat, so that the material will rapidly adjust itself to quick changes of temperature. The inside of the dies or the stamping surface is smooth and polished so that the ice cream may readily free itself therefrom.

The temperature of the dies should be maintained at from eight to twelve degrees above freezing, or at about forty degrees Fahrenheit. It is necessary that they are slightly warmer than the ice cream in order for the ice cream to free itself from them.

However, they should not be warm enough to cause excessive melting, as this would destroy the sharp outlines of the shapes. The dies should be provided with small air holes 7 at different points to permit the escape of the air as they are stamped around the ice cream, and to break the vacuum as the dies start backward. By this process of stamping objects from ice cream it is possible to eliminate handling by hand and thereby eliminate finger marking and partial melting from body heat. As the objects leave the dies they are smooth and firm and may readily be wrapped and placed in a sharp or cold room until needed.

It will be understood that this process may be varied considerably as the condition of the ice cream fed to the dies may be changed materially, and the means for holding the objects as they leave the dies may be changed or omitted as desired.

Having thus fully described the invention, what I claim as new and desire to secure by Letters Patent is:

1. The process of producing individual shapes from bulk ice cream which consists in storing the bulk ice cream at from 12 to 20 degrees below zero, subjecting the bulk ice cream to a higher temperature, making it ductile, then subjecting it to a comparatively low temperature to freeze a crust on the outer surface, then in this condition stamping the bulk into individual shapes relieving suction between the ice cream and stamping means, controlling the temperature of the stamping means, and conveying the bulk ice cream and shapes to and from the stamping operation with an intermittent motion independent of the stamping means.

2. The process of producing individual shapes from bulk ice cream which consists in storing the bulk ice cream at from 12 to 20 degrees below zero, subjecting the bulk ice cream to a higher temperature, making it ductile, then subjecting it to a comparatively low temperature to freeze a crust on the outer surface, then in this condition stamping the bulk into individual shapes controlling the temperature of the stamping means, relieving the suction between the stamping means and shapes, and conveying the bulk ice cream to and from the stamping operation with an intermittent motion.

3. The process of stamping ice cream from bulk into shapes which consists in freezing the exterior of the cream forming a hard frozen crust with a ductile center, forming the ice cream into individual shapes in which the forming means is at a higher temperature than the cream, relieving the suction between the forming means and shapes, and supporting and conveying the ice cream before and after it is formed into shapes by the same means.

4. The process of forming ice cream in bulk, supplied in strips with a comparatively hard outer surface and a ductile center, which comprises stamping the ice cream into individual shapes with the stamping means at a higher temperature than the ice cream, relieving the suction between the ice cream and stamping means and supporting the strips and shapes by means extending into the strips at points corresponding with the centers of the shapes, and in which the same supporting means support the strips and shapes.

5. The process of forming ice cream in bulk supplied in strips with a comparatively hard outer surface and a ductile center which comprises stamping the ice cream into individual shapes with the stamping means at a higher temperature than the ice cream, controlling the temperature of the stamping means, and supporting the strips and shapes by means extending into the strips at points corresponding with the centers of the shapes, and in which the same supporting means support the strips and shapes.

6. The process of stamping ice cream from bulk into shapes which consists in freezing the exterior of the cream forming a hard frozen crust with a ductile center, forming the ice cream into individual shapes in which the forming means is at a higher temperature than the ice cream, and the temperature thereof is controlled, embossing characters or designs on the said shapes by said forming means, and supporting the bulk ice cream and shapes by points extending into the ice cream and shapes at points corresponding with the centers of the shapes.

In testimony whereof he affixes his signature.

MILLARD G. HARNDEN.